No. 644,613. Patented Mar. 6, 1900.
W. LENNARD-FOOTE.
TIRE FOR BICYCLE OR OTHER VEHICLE WHEELS.
(Application filed June 26, 1899.)
(No Model.)

WITNESSES:
Geo. B. Rowley.
Wm. J. Whitehouse

INVENTOR
William Lennard-Foote

UNITED STATES PATENT OFFICE.

WILLIAM LENNARD-FOOTE, OF NEW YORK, N. Y.

TIRE FOR BICYCLE OR OTHER VEHICLE WHEELS.

SPECIFICATION forming part of Letters Patent No. 644,613, dated March 6, 1900.

Application filed June 26, 1899. Serial No. 721,824. (No model.)

*To all whom it may concern:*

Be it known that I, WILLIAM LENNARD-FOOTE, a citizen of the United States, and a resident of New York, borough of Brooklyn, county of Kings, and State of New York, have invented certain new and useful Improvements in Tires for Bicycle or other Vehicle Wheels, of which the following is a specification.

This invention relates to tires for the wheels of vehicles, including bicycles; and an object of the invention is to devise a pneumatic tire which shall be durable and easily applied by an unskilled person.

A further object is to obtain all the advantages of an inflated air-tube in a vehicle-tire without having the air-tube in contact with the roadway, thereby also avoiding the possibility of the inflated tube being punctured when the vehicle is in use.

In the present invention I make use of a cork base adapted to be received by the groove in the rim of the wheel, and in this respect the invention resembles that shown and described in my Letters Patent, granted March 21, 1899, No. 621,451; but in the patented structure there is no pneumatic tube employed as in the present instance, and there are other important novel features embodied in the new structure.

Figure 1:
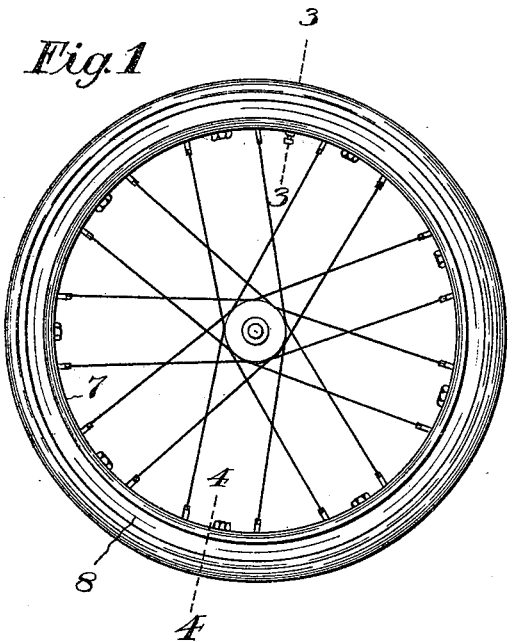
Figure 2:
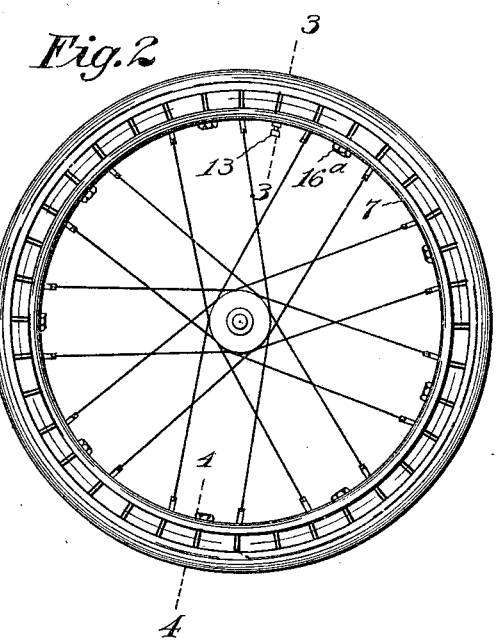
Figure 3:
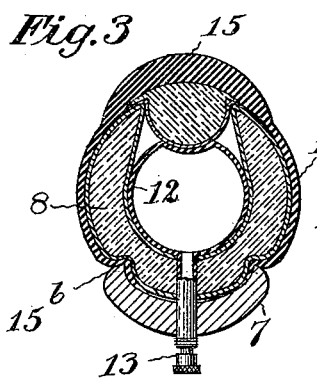
Figure 4:
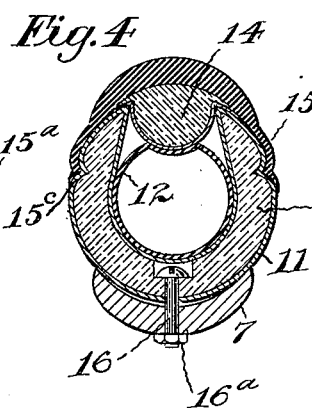
Figure 5:
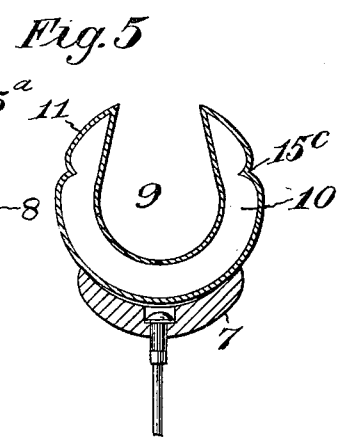
Figure 6:

In the accompanying drawings, forming a part of this specification, and wherein like features are indicated by like numerals of reference in the several views, Figure 1 is a side view of a vehicle-wheel having a tire composed of a continuous base of molded cork. Fig. 2 is a similar view with the cork base composed of sections. Fig. 3 is a cross-section on the line 3 3 of Figs. 1 and 2 close to the valve of the pneumatic tube. Fig. 4 is a cross-section on the line 4 4 of Figs. 1 and 2, showing the bolts by which the tire is clamped to the wheel-rim. Fig. 5 is a cross-section through the cork base and wheel-rim, showing the connection of the spoke to the rim; and Fig. 6 is a detached view of the core resting on the periphery of the cork base and being interposed between the air-tube and the tread of the tire.

Referring to the drawings, 7 indicates the usual grooved rim of the vehicle-wheel, and 8 a cork base seated in the grooved rim 7. The cork base is provided with a deep channel 9 and has an exterior surface adapting it to seat snugly in the groove of the rim 7. The cork base may be made either in a continuous piece, molded from cork waste, as described in my Letters Patent No. 621,451, or in sections of suitable length. When the base is made in sections, I may place between the joints of the sections a thin plate or washer 10, of rubber, rawhide, or leather, to add rigidity and strength to the base.

The cork base or each individual section thereof is provided with a covering 11, of canvas or other suitable material, adapted to receive a varnish and serving to protect the base. The ends of this covering are brought together at the bottom of the channel 9 and firmly cemented in place.

Within the channel 9 of the base 10 there is arranged a rubber tube 12, which is adapted to be inflated through the valve 13, connected to the tube and extending through the cork base and wheel-rim. Resting on the periphery of the cork base 8, over the top of the channel 9, is a core 14, which extends into the channel sufficiently to permit the tube 12 when inflated to bear firmly against it. The core 14 may be made of cork, rubber, leather, or other suitable material, but preferably of cork on account of its lightness. The core 14 may also be provided on its under surface with a covering $14^a$, of canvas or the like, which serves to protect and strengthen the same.

The tread or outer casing, which is in contact with the roadway, is indicated at 15. It is made of rubber, leather, rawhide, or other suitable material. This tread 15 is of a desirable thickness and preferably of the conformation shown in cross-section in the drawings, and it is placed in position over the core 14 and secured in place by having its side extensions $15^a$ sufficiently long to extend down to the wheel-rim 7 and enter suitable grooves $15^b$, formed in the cork base just within the edges of the wheel-rim 7, the rim 7 being sprung back to permit the ends of the extensions $15^a$ to be secured within the grooves. The ends of the extensions $15^a$ may also be cemented within the grooves $15^b$. Instead of having the extensions $15^a$ sufficiently long to reach down to the wheel-rim they may terminate just below the thickened part of the tread 15 and be secured to the cork base by being cemented in the grooves 15ᶜ formed in the base, as shown in Fig. 4. The extensions 15ᵃ of the tread serve not only to hold the tread in place, but also to protect the cork base against injury by stones or the like on the roadway.

When the tube 12 in the channel of the base 8 is inflated and forced against the core 14, which fills the opening to channel 9, a cushioning support for the tread 15 is provided, since the tread 15 bears directly on the core 14, which is elastically supported by the pneumatic tube within the channel of the base of the tire.

The tire is secured to the rim of the wheel by small bolts 16, fastened to the base 8 and passing through the rim 7 and provided with screw-nuts 16ᵃ, as shown in Fig. 4.

The base of cork is light as well as elastic, both of which are desirable qualities in a wheel-tire. The pneumatic tube being incased within the base is completely protected against puncture, and the core 14 interposed between the protected pneumatic tube and the tread 15 is of sufficient thickness to prevent puncture of the pneumatic tube by any device that might accidentally enter the tread 15. All the advantages of an exposed pneumatic tire are obtained by my present invention with the obvious additional advantages due to its novel construction.

Having thus described my invention, what I claim as new, and desire to secure by Letters Patent, is—

1. In a tire for bicycle and other vehicle wheels, the combination with a base of cork provided with a continuous channel, of a pneumatic tube in said channel, a core closing the entrance to said channel and a tread of suitable material covering the core and suitably secured to the cork base.

2. In a tire for bicycle and other vehicle wheels, the combination with a base of cork provided with a continuous channel and covered exteriorly and interiorly by canvas or the like, of a pneumatic tube in the channel of the base, a core suspended over the entrance to the channel and a tread of suitable material covering said core and having side extensions whose edges are fastened to the cork base.

3. In a tire for bicycle and other vehicle wheels, the combination with a base of cork provided with a continuous channel and with a covering of canvas and the like, of a pneumatic tube in the channel of the base, a core closing the entrance to said channel and a tread of suitable material covering said core and having side extensions covering the base between the tread and the rim of the wheel with the ends of said extensions secured in place beneath the edges of the wheel-rim.

4. In a tire for bicycle and other vehicle wheels, the combination with a base of cork composed of channeled sections of suitable length, whereby when the sections are connected in a ring a channel extends throughout the ring, of a pneumatic tube in said channel, a core closing the entrance to said channel and a tread of suitable material covering the core and suitably secured to the cork base.

5. In a tire for bicycle and other vehicle wheels, the combination with a base of cork composed of channeled sections of suitable length and plates or washers of suitable material interposed between the sections, of a pneumatic tube in the continuous channel of the cork base, a core closing the entrance to said channel and a tread of suitable material covering the core and suitably secured to the cork base.

6. The combination with the grooved rim of a vehicle-wheel, of a base of cork provided with a continuous channel and seated in said groove of the rim, bolts connected to said base and passing through the grooved rim and provided with screw-nuts whereby the base is secured to the rim, a pneumatic tube within the channel of the base, a core filling the entrance to said channel and a tread of suitable material covering the core and having extensions suitably secured to the base.

7. The combination with a base of cork provided with a continuous channel and covered interiorly and exteriorly with canvas or the like, of a pneumatic tube in the channel of said core, a core of cork provided with a canvas covering on its under surface and supported on the cork base at the entrance to its channel, and a tread of suitable material covering said core and suitably secured to the base.

8. The combination with the wheel-rim and a base of cork provided with a continuous channel, of a pneumatic tube placed in said channel, a core closing the entrance to said channel, a tread of suitable material covering the core and secured to the cork base, and a valve for inflating the pneumatic tube connected to said tube and extending through the cork base and the wheel-rim.

Signed at New York, in the county and State of New York, this 22d day of June, 1899.

WILLIAM LENNARD-FOOTE.

Witnesses:
WM. J. WHITEHOUSE,
J. E. M. BOWEN.